United States Patent [19]

van der Lely

[11] 4,175,624

[45] Nov. 27, 1979

[54] SOIL CULTIVATING IMPLEMENT

[76] Inventor: Cornelis van der Lely, 7, Brüschenrain, Zug, Switzerland

[21] Appl. No.: 822,661

[22] Filed: Aug. 8, 1977

[30] Foreign Application Priority Data

Aug. 9, 1976 [NL] Netherlands .................... 7608815

[51] Int. Cl.² ........................................... A01B 33/06
[52] U.S. Cl. ....................................... 172/59; 172/713
[58] Field of Search ................. 172/59, 713, 111, 522, 172/526, 700, 523, 52

[56] References Cited

U.S. PATENT DOCUMENTS

| 109,719 | 11/1870 | Corbin | 172/523 |
| D. 245,910 | 9/1977 | Lely | 172/713 |
| 2,528,576 | 11/1950 | Brown | 172/522 X |
| 3,765,491 | 10/1973 | Lely | 172/111 |
| 3,920,079 | 11/1975 | Lely | 172/59 |

FOREIGN PATENT DOCUMENTS

| 967149 | 3/1950 | France | 172/111 |
| 1386256 | 12/1964 | France | 172/111 |
| 2274207 | 1/1976 | France | 172/59 |
| 7413903 | 4/1976 | Netherlands | 172/59 |

Primary Examiner—Richard J. Johnson

[57] ABSTRACT

A rotary harrow has a row of soil working members that are driven to rotate about upwardly extending axes and work overlapping paths. Each member has spaced apart downwardly extending tines having lower soil working portions. A flat tool is fitted on each tine with a sleeve-like fastening portion that is releasably bolted to the soil working portion. The tools are planar and mounted to extend generally perpendicular to the member's axis of rotation to cut stubble and roots. Each tool has sides that surround the respective tool and the sides form cutting edges that meet at points, the rearmost point being located further from the tine than the foremost point. The tools of adjacent members are positioned at different levels to avoid fouling.

19 Claims, 4 Drawing Figures

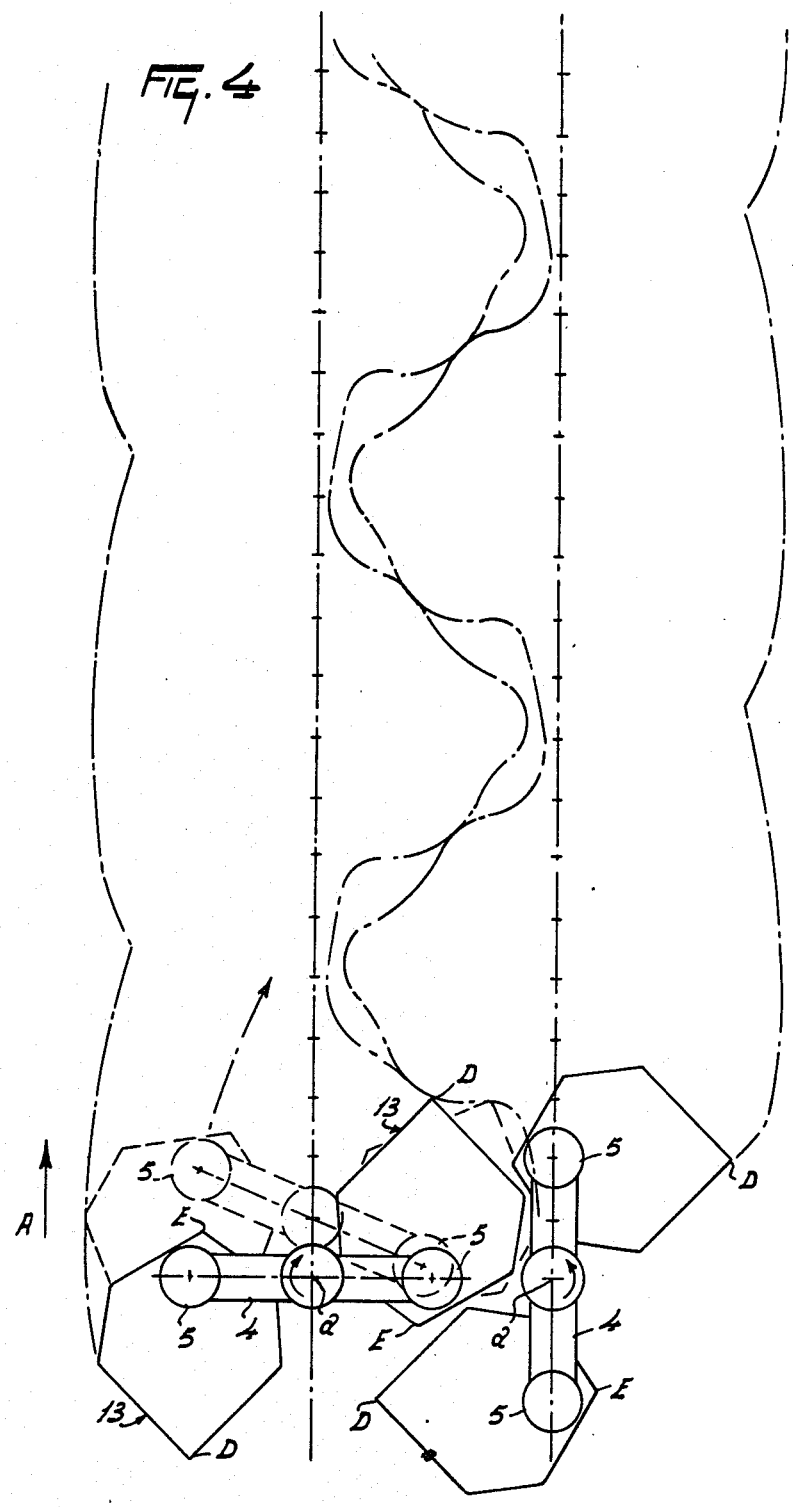

SOIL CULTIVATING IMPLEMENT

According to one aspect of the invention, there is provided a soil cultivating implement of the kind set forth, wherein at least some of the tines are each provided, between their opposite ends, with a soil working tool having an operating portion that surrounds the tine concerned at all sides.

Figure 1:
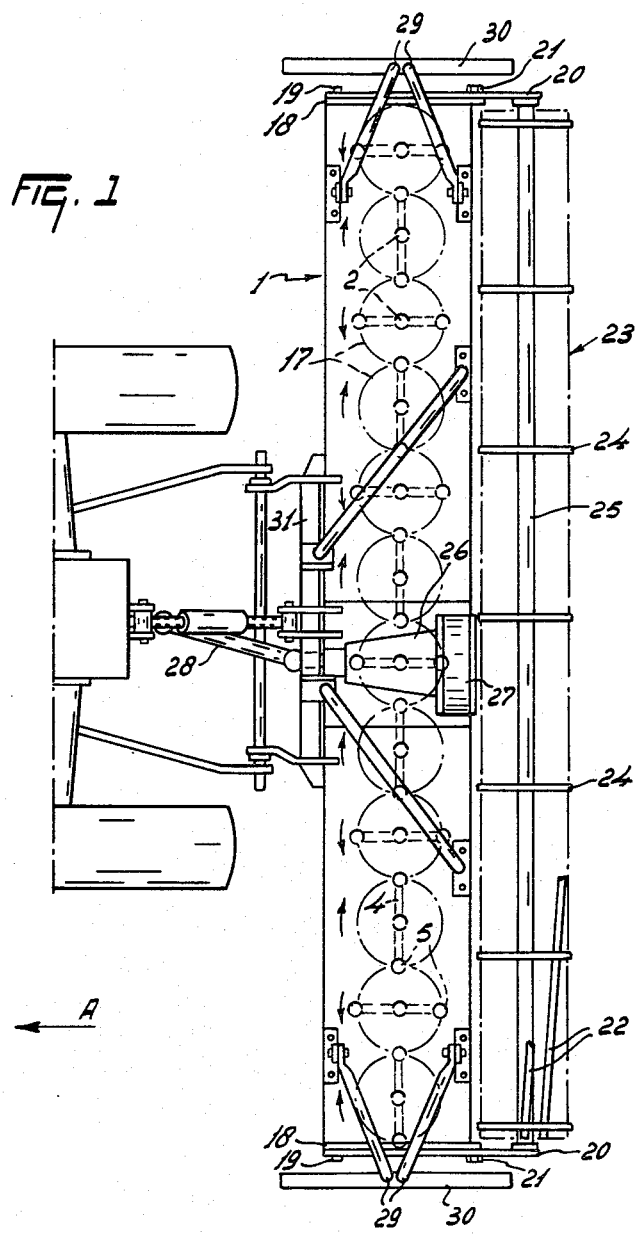
Figure 2:
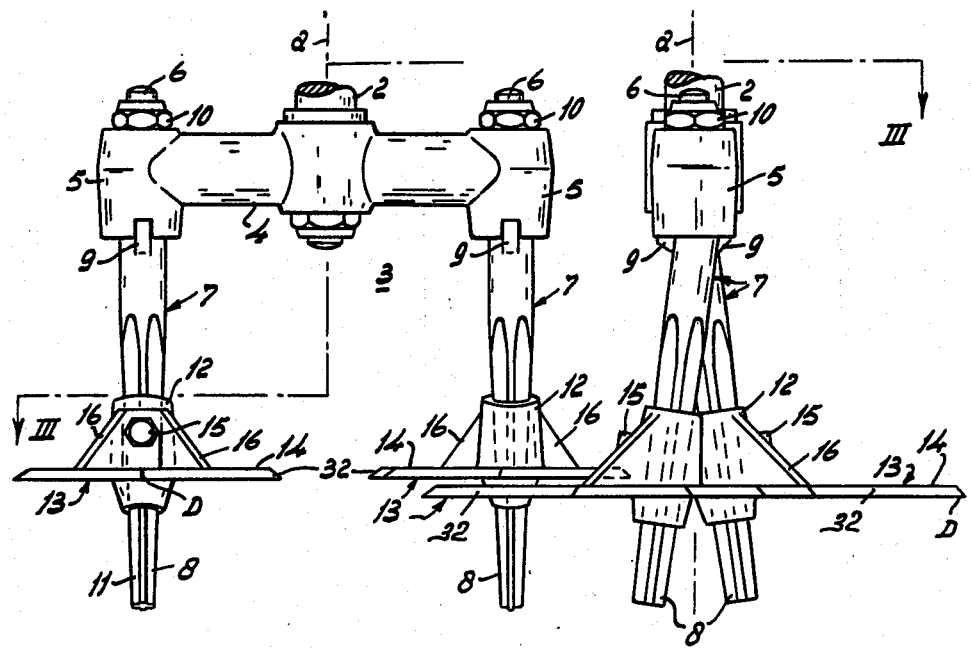
Figure 3:
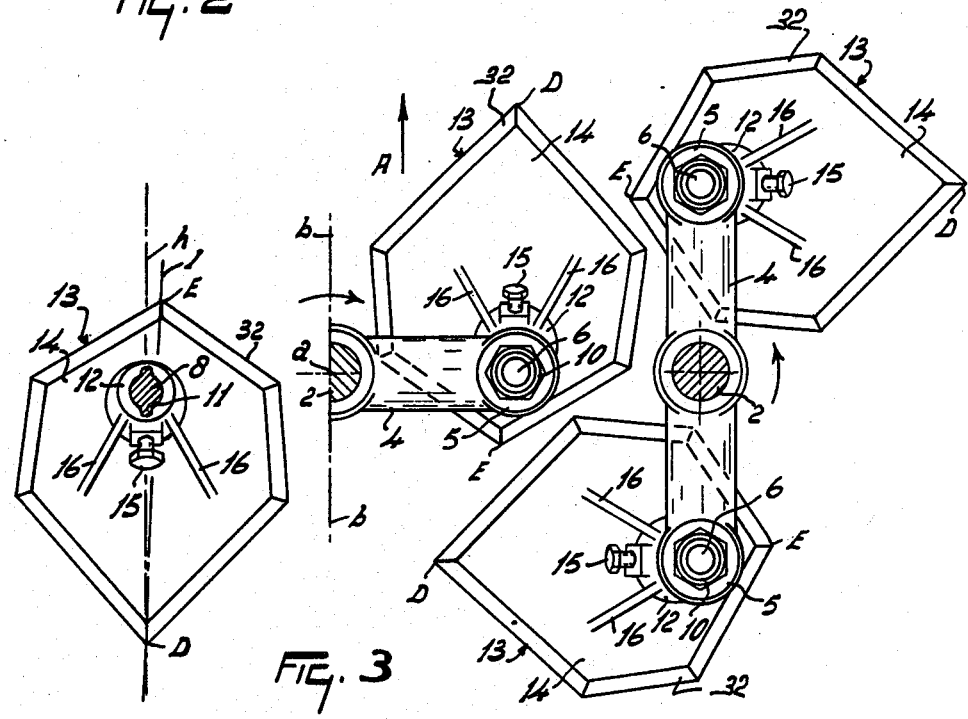

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is an elevation, to an enlarged scale, illustrating the construction and arrangement of two immediately neighbouring rotary soil working members of the implement of FIG. 1, FIG. 3 is a section taken on the line III—III in FIG. 2, and FIG. 4 is a diagram showing schematically the operation of the two immediately neighbouring rotary soil working members of FIGS. 2 and 3 of the drawings during working of the implement.

Referring to the drawings, the implement that is illustrated therein is a soil cultivating implement (or machine) that has a hollow box-section frame portion 1 that extends substantially horizontally transverse, and usually substantially horizontally perpendicular, to the intended direction of operative travel of the implement that is indicated by an arrow A in FIGS. 1, 2 and 4 of the drawings. A plurality (in this case, twelve) of upwardly extending and usually vertically or substantially vertically disposed shafts 2 are rotatably mounted in a single row in the hollow frame portion 1 with their longitudinal axes (axes of rotation) spaced apart from one another at regular intervals which preferably, but not essentially, have magnitudes of substantially 25 centimeters. The shafts 2 project downwardly from beneath the bottom of the hollow frame portion 1 and each downwardly projecting shaft portion has a corresponding rotary soil working member, that is generally indicated by the reference 3 (FIG. 2), firmly but releasably secured to it in the manner that can be seen in FIGS. 2 and 3 of the drawings. Thus, the downwardly projecting portion of each shaft 2 is splined or otherwise keyed and co-operates with matching internal splines or keys of a central hub of a substantially horizontally disposed tine support or carrier 4, axial disengagement of the hub from the co-operating shaft 2 being prevented by a retaining nut mounted on a short screwthreaded extremity of the shaft 2 concerned. The opposite ends of each tine support or carrier 4 are provided with two substantially cylindrical sleeve-like tine holders 5 whose longitudinal axes extend substantially parallel to the longitudinal axis (axis of rotation) a of the shaft 2 concerned. Each holder 5 receives a fastening portion 6 of a corresponding rigid soil working tine 7 that extends downwardly from the holder 5 into the soil when the implement is in use. The lower end of each fastening portion 6 merges integrally into a soil working portion 8 of the tine 7 concerned and it will be seen from the drawings that the two portions 6 and 8 of each tine 7 are both straight but that said portions are inclined to one another in such a way that an angle which preferably has a magnitude of substantially 8° is enclosed between their respective longitudinal axes, the tines 7 being mounted for most cultivating operations in such a way that the soil working portions 8 thereof are swept back rearwardly from root to tip with respect to the intended direction of operative rotation of the corresponding member 3 (see the small arrows in FIGS. 1, 3 and 4 of the drawings which indicate these directions of rotation).

Each tine 7 is provided, at substantially the level of the junction between its fastening portion 6 and soil working portion 8, with two diametrically opposed lugs 9 which lugs are received in co-operating notches or recesses that are provided at the lower ends of the tine holders 5. It will be appreciated that, when the lugs 9 are entered in the notches or recesses, the tines 7 are prevented from turning in the holders 5 about the longitudinal axes of their fastening portions 6. The uppermost ends of the fastening portions 6 of the tines are formed as short screwthreaded parts and these parts co-operate with fastening nuts 10 to retain the tines 7 firmly, but releasably, in their appointed positions in the soil working members 3. The nuts 10 are preferably of a known kind which are formed to resist the loosening thereof which would otherwise tend to occur as a result of the vibration which inevitably takes place during the operation of the implement. The previously mentioned nuts which co-operate with the lowermost screwthreaded ends of the shafts 2 are also, preferably, of the same kind. The soil working portion 8 of each tine 7 has a cross-section which differs in shape as one proceeds downwardly therealong from the integral junction with the respective fastening portion 6 to the lowermost free end or tip of the tine. Each portion 8 is of substantially circular cross-section near its upper end but, lower down, the tine is flattened to some extent and is formed along its length with four grooves 11. A cross-section which can best be described as being substantially rhombic is thus produced, the four grooves 11 being formed in the what would otherwise be flat sides of the substantially rhombic cross-section. The leading and rearmost corners of the substantially rhombic cross-section, with respect to the intended direction of operative rotation of the corresponding soil working member 3, are flattened to form ribs while the other two opposite corners are rounded off. The grooves 11 extend throughout substantially the lower two-thirds of the length of each soil working portion 8 and it is throughout this length that the portion 8 is flattened to produce the progressively more pronounced substantially rhombic cross-section and the downward taper that is evident as viewed at the left-hand side of FIG. 2 of the drawings.

The soil working portion 8 of each tine 7 carries a sleeve-like fastening portion 12 of a corresponding forged or cast soil working tool 13, the tool 13 comprising a flat operating blade 14 that is formed as a plate, said blade 14 surrounding the soil working portion 8 of the tine 7 concerned on all sides as viewed in a direction parallel to the longitudinal axis of that portion 8. The sleeve-like fastening portions 12 of the tools 13 are provided with clamping set bolts 15 which are disposed at the rears of said portions 12 with respect to the intended directions of operative rotation of the corresponding soil working members 3, the inner tips of the set bolts 15 co-operating clampingly with the rear ribs of the substantially rhomic cross-section regions of the portions 8 that have been discussed above. The set bolts 15 co-operate with the rear ribs at levels which are close to the midpoints of the soil working portions 8 of the tines 7 considered from the tops to the bottoms of those portions.

The flat operating blades 14 of the tools 13 are not perpendicular to the longitudinal axes of the sleeve-like fastening portions 12 but are inclined thereto in such a way that, when the tools 13 are mounted in their operative positions, the general planes of the blades 14 will be perpendicular, or substantially perpendicular, to the axes of rotation a of the corresponding soil working members 3. As seen in plan view (FIG. 3), each blade 14 is of irregular hexagonal configuration having four successively neighbouring sides that are of substantially, although not exactly, equal lengths and two considerably longer neighbouring sides that make a junction at a point D which is the rearmost point of the blade 14 concerned with respect to the intended direction of operative rotation of the corresponding soil working member 3. The longer sides that have just been mentioned have substantially twice the lengths of the four shorter but substantially equal length sides. The two shorter sides of each irregular hexagonal blade 14 that have ends which adjoin ends of the two longer sides of that blade are both substantially tangential to circles that are centered upon the corresponding axis of rotation a but the lengths of the two shorter sides under discussion are forwardly convergent by a few degrees in the intended direction of operative rotation of the member 3 concerned. The two remaining shorter sides are steeply forwardly convergent in the direction which has just been mentioned and join at a point E which is the foremost point of the blade 14 concerned with respect to the intended direction of operative rotation of the soil working member 3 upon which the respective tool 13 is mounted. The last mentioned steeply convergent two shorter sides are of equal lengths but their lengths are a little greater than those of the two substantially tangential shorter sides that are discussed above.

It will be immediately apparent from FIG. 3 of the drawings that the rearmost point D of the blade 14 of each tool 13 is spaced considerably further from the longitudinal axis of the respective tine soil working portion 8 than is the corresponding foremost point E and that, consequently, the points D are further remote from the respective axes of rotation a than are the points E. Two strengthening ribs 16 that are each of substantially triangular configuration interconnect each sleeve-like fastening portion 12 and the upper surface of the respective flat operating blade 14. It will be seen from FIGS. 2 and 3 of the drawings that the two ribs 16 of each tool 13 are located at the rear of the fastening portion 12 of each tool 13 with respect to the corresponding tine portion 8 and diverge rearwardly from that portion 12 with respect to the intended direction of operative rotation of the respective soil working member 3 as seen in the plan view of FIG. 3. The two strengthening ribs 16 of each tool 13 lie at opposite sides of the corresponding set bolt 15 and thus form a rearwardly directed cavity in which the set bolt 15 is protected from collisions with stones and the like and from having its screwthread seriously damaged by abrasive wear. It can be seen in FIG. 3 of the drawings that, for each blade 14, a line h which contains the rear point D of that blade and that intersects the longitudinal axis of the soil working portion 8 of the tine 7 to which the tool 13 concerned is secured is in tangential relationship with an imaginary circle centered upon the axis of rotation a of the corresponding soil working member 3. On the other hand, a line l which interconnects the rear point D and the leading point E of each respective blade 14 is inclined to the line h by a few degrees so as to diverge away from that line h, forwardly from the point D, towards a plane b—b that contains the axis of rotation a of the soil working member 3 under consideration and that is parallel to the line h in question. It is immediately evident from this relationship that the leading point E of each blade 14 is closer to the corresponding plane b—b than is the rear point D.

It will be evident from FIG. 3 of the drawings that the lateral extent of the tools 13 from the tines 7 is greater than the spacing that exists between the two tools 13 of one soil working member 3 and also that the tools 13 of immediately adjacent members 3 would foul one another during the operation of the implement if they were not mounted at slightly different horizontal levels (see FIG. 2). Each of the shafts 2 is provided, inside the hollow frame portion 1, with a corresponding straight-toothed or spur-toothed pinion 17 and the sizes and arrangements of the pinions 17 are such that the teeth of each pinion are in mesh with those of its immediate neighbour, or with those of both of its immediate neighbours, in the single row thereof. Thus, during operation of the implement, each pinion 17 (and the corresponding soil working member 3) revolves in a direction which is opposite to the direction of rotation of its immediate neighbour or of both of its immediate neighbours. The opposite ends of the hollow frame portion 1 are closed by substantially vertical side plates 18 which are in parallel relationship with one another and parallel or substantially parallel relationship with the direction A, each side plate 18 being extended rearwardly by a short distance beyond the bak of the hollow frame portion 1. Upper leading points, with respect to the direction A, on the two side plates 18 carry horizontally aligned pivots 19 about which arms 20 that extend rearwardly therefrom with respect to the direction A are upwardly and downwardly turnable alongside the respective plates 18. The rearwardly projecting portions of the two side plates 18 are formed with curved rows of holes in which each hole is at the same distance from the axis defined by the pivots 19 and the two arms 20 are formed with single holes at the same distance from said axis so that said single holes can be brought into register with chosen ones of the holes in the side plates 18. Bolts 21 are provided for horizontal entry through the holes in the arms 20 and chosen ones of the holes in the side plates 18 and, when said bolts 21 are entered and tightened, the arms 20 are retained in corresponding angular positions about the axis defined by the pivots 19. The arms 20 extend downwardly and rearwardly beyond the rear edges of the side plates 18 at the back of the implement and their lowermost and rearmost ends carry horizontally aligned bearings in which a supporting member in the form of a soil crumbling roller 23 is mounted in a freely rotatable manner. The roller 23 comprises a central support shaft or tube 25 to which a plurality, such as seven, of substantially circular plates 24 are secured at regularly spaced apart intervals with all of the substantially vertically disposed plates 24 in parallel relationship with one another and parallel or substantially parallel relationship with the direction A. A plurality of elongate elements 22 in the form of rods or tubes are entered through holes that are formed close to the peripheries of the plates 24 and it will be seen from FIG. 1 of the drawings that the elements 22 are preferably, but not essentially, arranged in helically wound relationship around the substantially horizontal longitudinal axis (axis of rotation) of the roller 23. The roller 23 sustains the implement from the ground surface during its operative progress in the direction A and controls the maximum depth to which its tines 7 can penetrate into the earth as the result of the level of its axis of rotation having been set at a chosen level relative to that of the frame portion 1 by prior angular adjustment of the arms 20 about the axis defined by the pivots 19 and maintenance of that setting by the bolts 21. The elements 22 of the roller 23 crush any lumps of soil that may have been left upon the surface of the ground by the foregoing tines 7 and assist in distributing the soil displaced and broken up by those tines 7 substantially uniformly throughout the working width of the implement.

One of the center pair of the single row of shafts 2 has an upward extension through the top of the hollow frame portion 1 into a gear box 26 which is secured in position on top of that frame portion. Bevel pinions (not visible) within the gear box 26 place the upward shaft extension in drive connection with a substantially horizontal shaft (not visible) that extends substantially parallel to the direction A. The rearmost end of the substantially horizontal shaft which has just been mentioned and the rearmost end of a rotary input shaft of the gear box that lies thereabove in parallel relationship therewith both project through the back of the gear box 26 into a change-speed gear 27 that is carried at the rear of the gear box 26. The two parallel but spaced shaft ends are splined or otherwise keyed inside the casing of the change-speed gear 27 and are arranged to receive the matchingly splined or otherwise keyed hubs of a chosen pair of co-operating straight-toothed or spur-toothed pinions. At least two such co-operating pairs are preferably provided with the two pinions in each pair of different sizes. The particular pair of pinions that is used, and the arrangement thereof that is chosen relative to the shaft ends, dictates the transmission ratio between the rotary input shaft of the gear box 26 and all of the shafts 2 and thus the speed at which the soil working members 3 will revolve around the respective axes a in response to a substantially constant speed of rotation applied to the rotary input shaft of the gear box 26 which shaft has a splined or otherwise keyed leading end that projects forwardly in substantially the direction A from the front of said gear box 26. This splined or otherwise keyed shaft end is arranged to be placed in driven connection with the rear power take-off shaft of an agricultural tractor or other operating vehicle through the intermediary of a telescopic transmission shaft 28, which is of a construction that is known per se, having universal joints at its opposite ends.

Substantially vertically disposed shield plates 30 lie immediately beyond the opposite ends of the row of soil working members 3 and are connected by corresponding pairs of arms 29 to pivotal mountings on the top of the hollow frame portion 1 at short distances inwardly from the opposite ends of that frame portion. The pivotal mountings define substantially horizontal axes that are substantially parallel to the direction A and thus allow the shield plates 30 to turn upwardly and downwardly relative to the hollow frame portion 1 to match undulations in the surface of the ground that may be met with during operative progress in the direction A or during manoeuvring in the opposite direction, lower edges of the shield plates 30 being constructed and arranged to slide over the ground surface in the direction A or in the opposite direction. The shield plates 30 cooperate with the neighbouring soil working members 3 at the opposite ends of the row, also serving to prevent significant ridging at the opposite sides of the broad strip of soil that is worked by the implement and to prevent stones or other potentially injurious objects from being flung laterally of the path of travel of the implement by the rapidly revolving tines 7. The front of the hollow frame portion 1 with respect to the direction A is provided midway across the width of the implement with a coupling member or trestle 31 that is of substantially triangular configuration as seen in front or rear elevation. The coupling member or trestle 31 is arranged to co-operate with the three-point lifting device or hitch at the rear of an agricultural tractor or other operating vehicle in the generally known manner that is illustrated in outline in FIG. 1 of the drawings. Tie beams whose positions can be seen in FIG. 1 of the drawings diverge downwardly and rearwardly with respect to the direction A from locations close to the apex of the generally triangular coupling member or trestle 31 to locations at the top and rear of the hollow frame position 1 which are well spaced apart from one another in a horizontal direction that is substantially perpendicular to the direction A.

In the use of the soil cultivating implement for machine that has been described, its coupling member or trestle 31 is connected to the three-point lifting device or hitch at the rear of an agricultural tractor or some other operating vehicle and the rotary input shaft of the gear box 26 is placed in driven connection with the power take-off shaft of the same tractor or other vehicle by way of the known telescopic transmission shaft 28 that has universal joints at its opposite ends. Adjustments that are made, if required, before work commences include setting the speed of rotation of the soil working members 3 about the axes a in response to a substantially constant input speed of rotation applied to the gear box 26 by an appropriate selection and arrangement of pinions in the change-speed gear 27 and controlling the maximum depth to which the tines 7 can penetrate into the soil by fixing the arms 20 in appriopriate angular positions about the axis defined by the pivots 19 in the manner discussed above. These adjustments will be made principally having regard to the nature and condition of the soil that is to be worked and the particular purpose for which that soil is required after cultivation. As the implement makes operative progress in the direction A, its soil working members 3 revolve in the directions that are indicated by small arrows in FIGS. 1, 3 and 4 of the drawings and work individual strips of ground that overlap one another to produce, in effect, a single broad strip of worked soil which, in the case of the particular implement that is being described, will have a width of substantially 3.0 meters. The tools 13 that are carried by the soil working portions 8 of the tines 7 are, of course, moved through the soil in the same directions as the tines 7 and the blades 14 that completely surround said tine portions 8 execute substantially the paths of movement through the soil that are shown diagrammatically in FIG. 4 of the drawings in respect of two immediately neighbouring soil working members 3. The blades 14 of the tools 13 of neighbouring members 3 pass very close to one another during operation and would be subject to fouling were it not for the vertical spacing between the blades 14 that correspond to immediately neighbouring soil working members 3 (see FIG. 2). Each side of each irregular hexagonal blade 14 is formed as a cutting edge 32 and these cutting edges slice through the roots of weeds and residual crop at substantially a predetermined depth beneath the ground surface, the co-operation between the tools 13 on the tines 7 of immediately neighbouring members 3 being such that a large proportion of the cut roots are left lying on the surface of the worked soil. The particular irregular hexagonal shape of each tool blade 14 that has been described and that is illustrated in the drawings has been found to be advantageous in enhancing the cutting effect of the edges 32. It has been found that a stubble field can be worked very effectively even when the soil working members 3 are rotated at a lower than usual speed, such as 131 revolutions per minute, while the implement is travelling in the direction A at a somewhat faster than usual speed of, for example, 7 kilometers per hour. Even under such conditions, the tools 13 effectively cut loose the stubble and any weed infestation and leave most of the weeds, in particular, lying on the ground surface with their cut roots directed generally upwardly so that a large majority of them will be dried and will therefore die.

It will be apparent from the discussion in the preceding paragraph that an implement in accordance with the invention is particularly, although by no means exclusively, suitable for use in fields that have been employed for growing cereal crops after the harvesting of such crops. The implement can also be used advantageously on land that requires cultivation but that is heavily infested with weeds. It has been found that the efficiency of known soil cultivating implements that employ a plurality of rotary soil working members, not provided with the tools 13, can be considerably reduced in stubble fields and land that is heavily infested with weeds as a result of plant fragments, roots and so on becoming wound around the tines and interfering with the proper operation of those tines. The set bolts 15 by which the tools 13 are releasably secured to the soil working portions 8 of the tines 7 are protected from collision damage with stones and the like and from excessive abrasive wear upon their screwthreads and the like, which would make them difficult to remove and reinstall, by their positions at the rears of the fastening portions 12 of the tools 13 with respect to the intended directions of operative rotation of the soil working members 3, the set bolts 15 being disposed in the cavities between the strengthening ribs 16. It is, of course, only necessary to loosen the set bolts 15 to enable the tools 13 to be removed from the implement so that the latter can be used, where circumstances dictate it, without the tools 13. It is acknowledged that, when the tools 13 are removed, the implement is no longer an implement within the scope of the present invention.

Although various features of the soil cultivating implement that has been described and/or that is illustrated in the accompanying drawings will be set forth in the following claims as inventive features, it is emphasised that the invention is not necessarily limited to those features and that it includes within its scope each of the parts of the soil cultivating implement that has been described, and/or that is illustrated in the accompanying drawings, both individually and in various combinations.

What we claim is:

1. A soil cultivating implement comprising frame means and tined soil working members rotatably supported on said frame means, said members being mounted for rotating about corresponding upwardly extending axes, each member having two elongated and downwardly extending tines that are spaced apart and positioned around the respective axis of rotation, a plural sided tool being fastened to each tine, said tool being planar and having cutting edges that surround said tine, said edges meeting at points, said soil working members being mounted in a row to work overlapping paths and the tools of neighboring members being positioned at different levels to avoid fouling.

2. An implement as claimed in claim 1, wherein each tool has an operating portion that is of irregular hexagonal shape when viewed in a direction parallel to the longitudinal axis of that part of the tine to which said tool is secured.

3. An implement as claimed in claim 2, wherein each irregular hexagonal operating portion has four sides that are of substantially equal lengths and two longer sides that are substantially equal in length, said longer sides meeting at a point.

4. An implement as claimed in claim 3, wherein two of said four shorter sides extend substantially tangentially with respect to a circle centered upon the axis of rotation of said soil working member, the other two shorter sides meeting one another at a point located at the front of the operating portion concerned with respect to the normal direction of rotation of the two tines.

5. An implement as claimed in claim 3, wherein the point at which the two longer sides meet one another is located at the rear of said tool.

6. An implement as claimed in claim 4, wherein the two shorter sides that are substantially tangential to circles centered on the axis of rotation, are positioned so that their lengths converge forwardly.

7. An implement as claimed in claim 4, wherein the point at which the two longer sides of each operating portion meet, is spaced from the axis of rotation of the corresponding soil working member by a greater distance than is the point at which meet two of said shorter sides of the operating portion, the latter point being at the front of said operating portion.

8. An implement as claimed in claim 7, wherein a line containing the meeting point of the two longer sides and also intersecting the longitudinal axis of said tine, is substantially tangential to a circle centered upon the axis of rotation of the corresponding soil working member.

9. An implement as claimed in claim 8, wherein the meeting point between said two shorter sides is closer to a plane which contains the axis of rotation of the corresponding soil working member and that is parallel to said line which contains that point and that intersects said longitudinal axis, than is the meeting point between said two longer sides.

10. A soil cultivating implement comprising frame means and a plurality of tined soil working members rotatably supported on said frame means, said members being arranged adjacent one another and driving means connected to rotate said members about corresponding upwardly extending axes, at least one of said members comprising at least one elongated, downwardly extending soil working tine spaced from a respective axis of rotation and said tine comprising a lower soil working portion, a generally planar tool secured to said portion above the lower end thereof, said tool having an operative portion that is generally hexagonal in shape, when viewed in plan, and a fastening portion that surrounds the tine soil working portion, means releaseably fastening said tool to said soil working portion.

11. An implement as claimed in claim 10, wherein each soil working member has two tines and each tine has a tool secured between the opposite ends of that tine, said tool having a width which is greater than the spacing between the two tools.

12. An implement as claimed in claim 10, wherein each tine has a soil working portion which is swept back and trails rearwardly with respect to the normal direction of rotation.

13. An implement as claimed in claim 12, wherein each tine has a soil working portion with a cross section that varies along the length thereof, said cross section being substantially rhombic adjacent the lowermost free end thereof.

14. An implement as claimed in claim 10, wherein said fastening portion extends above the operative portion of said tool and strengthening ribs interconnect the two portions of said tool at the rear thereof, with respect to the normal direction of rotation.

15. An implement as claimed in claim 10, wherein there are a plurality of soil working members arranged in a row and each of said members has two tines, each of said two tines having a planar tool releaseably secured to the soil working portion thereof, the tools of neighbouring members being positioned at different horizontal levels to avoid fouling during operation while working overlapping paths.

16. A soil cultivating implement comprising frame means and a plurality of tined soil working members rotatably supported on said frame means, said members being arranged in a transverse row and driving means connected to rotate said members about corresponding upwardly extending axes, each of said members comprising at least one elongated downwardly extending soil working tine spaced from a respective axis of rotation and a generally planar tool secured between the upper and lower ends of said tine, neighboring soil working members being positioned to work overlapping paths of soil and the tools of neighboring members being positioned at different horizontal levels to avoid fouling during operation, at least one of said tools having an operative portion that is of irregular hexagonal shape when viewed in a direction parallel to the longitudinal axis of that part of the tine to which said tool is secured.

17. A soil cultivating implement comprising frame means and a plurality of tined soil working members rotatably supported on said frame means, said members being arranged adjacent one another and driving means connected to rotate said members about a corresponding upwardly extending axis, at least one of said members comprising at least one elongated downwardly extending soil working tine spaced from a respective axis of rotation and said tine comprising a lower soil working portion, a generally planar tool secured to said portion above the lower end thereof, said tool having an operative portion that is of irregular hexagonal shape when viewed in plan and a fastening portion that surrounds the tine's soil working portion, means releasably fastening said tool to said soil working portion.

18. An implement as claimed in claim 17, wherein said soil working portion has flat sides and longitudinal recesses extending at least part of the length of said sides.

19. An implement as claimed in claim 18, wherein a clamping bolt of said tool co-operates with a corner of said sides and secures said tool to said tine.

* * * * *